US005606693A

United States Patent [19]
Nilsen et al.

[11] Patent Number: 5,606,693
[45] Date of Patent: Feb. 25, 1997

[54] DISTRIBUTED DATABASE MANAGEMENT OVER A NETWORK

[75] Inventors: Kenneth Nilsen, Chappaqua, N.Y.; David Garcia, Danbury, Conn.

[73] Assignee: International Business Machines Corporation, Armonk, N.Y.

[21] Appl. No.: 473,154

[22] Filed: Jun. 7, 1995

Related U.S. Application Data

[62] Division of Ser. No. 259,376, Jun. 14, 1994, which is a continuation of Ser. No. 770,056, Oct. 2, 1991, abandoned.

[51] Int. Cl.$^6$ ............................ G06F 11/34; G06F 17/30
[52] U.S. Cl. .................... 395/610; 395/800; 395/200.03; 364/DIG. 1; 364/243.7; 364/268.3; 364/282.4
[58] Field of Search ............................ 395/600, 575, 395/800, 650, 200

[56] References Cited

U.S. PATENT DOCUMENTS

| | | | |
|---|---|---|---|
| 4,714,995 | 12/1987 | Materna et al. | 364/200 |
| 4,970,640 | 11/1990 | Beardsley et al. | 364/200 |
| 5,008,827 | 4/1991 | Sansone et al. | 364/464.02 |
| 5,157,667 | 10/1992 | Carusone, Jr. et al. | 371/29.1 |
| 5,175,800 | 12/1992 | Galis et al. | 395/51 |
| 5,351,019 | 9/1994 | McHugh et al. | 333/156 |
| 5,450,584 | 9/1995 | Sekiguchi et al. | 395/600 |
| 5,485,465 | 1/1996 | Liu et al. | 395/182.02 |
| 5,519,603 | 5/1996 | Allbery, Jr. et al. | 364/133 |

*Primary Examiner*—Thomas G. Black
*Assistant Examiner*—Cheryl Lewis
*Attorney, Agent, or Firm*—Lily Neff; William A. Kinnaman, Jr.

[57] ABSTRACT

A distributed database application for logging large volumes of data to a plurality of database servers. Central configuration management is employed to balance the database load, to direct requesting workstations to the appropriate database, and to manage the mirroring of data for fault tolerance and the location of distributed data for query, print, or archive purposes. This system is implemented using workstations and database servers, and configuration controllers connected to a dual network. Dual networks and dual configurators provide system redundancy for fault tolerance. The configuration controller provides database server access information to each requesting workstation. Each database server reports status and availability to the configuration controller which can then adjust future logging requests. The network operator can change the configuration stored in the configuration controller whenever reconfiguration is necessary such as by the addition of new database servers. A data logging modification is then communicated to each currently active requestor workstation by the configuration controller. Standard communications protocols are used between requestors, configurators, and the database servers which permits creation of a heterogeneous database server environment.

4 Claims, 2 Drawing Sheets

DISTRIBUTED DATABASE MANAGEMENT OVER A NETWORK

This application is a division of application Ser. No. 08/259,376, filed Jun. 14, 1994, which is a continuation of application Ser. No. 07/770,056, filed Oct. 2, 1991, and now abandoned.

BACKGROUND OF THE INVENTION

1. Field of the Invention

The present invention relates to information processing systems for maintaining databases, and in particular, to distributed database systems capable of managing large volumes of data.

2. Background and Prior Art

Information processing systems based upon digital computer technology are useful for analyzing and maintaining large amounts of information about business processes. Information systems are frequently applied to process control activities which generate a large amount of data which must be analyzed and which is frequently stored for later query and display. One example of such process control is the operation of a large computer system. The computer system will generate a large number of status, informational, and error messages. Each of these messages must be reviewed and a response given to the system. The messages are maintained in a log of messages and responses so that any operational problems can be tracked and solved.

The collection of console logs has traditionally been accomplished by writing the logs into a direct access storage device or tape storage device on the controlled computer system. The introduction of distributed control systems such as that described in concurrently filed and co-pending application Ser. No. 07/771,064, identified by attorney Docket Number KI9-91-053 and commonly assigned and now abandoned, allows automated management of the large system control process. In addition, it allows control of a number of separate systems from a single control area. Console data collected in this environment is most effectively stored in the same distributed workstation environment. However, the large volume of data to be stored makes existing workstation database options infeasible. Thus, the first problem to be addressed is the requirement to store large volumes of data on a distributed network.

A second problem to be solved is to provide a means for ensuring that data accessibility is not compromised by hardware or software failures, e.g. through redundancy and duplication of the data. Finally, a problem exists in developing a system capable of logging varying amounts of data by balancing the loads between separate data storage facilities.

Distributed databases and distributed database management is known in the prior art. For example, IBM Technical Disclosure Bulletin 02-89 pp. 474–475 entitled "Protocol for Hybrid Centralized Distributed Database System" describes a protocol for maintaining consistent data at central and distributed sites. Patent application Ser. No. 07/352,075, filed May 15, 1989, bearing attorney docket number AT9-89-030, commonly assigned now U.S. Pat. No. 5,560,008, discusses a remote authorization scheme relying on data at a database server.

Prior art distributed database systems typically replicate a single set of data to distributed sites, or store disjoint portions of the data at different sites. Thus, for example, a distributed inventory system may store the inventory information for each of a set of warehouses in a computer system located in or near each warehouse. This type of prior art system does not solve the present problems, however, because the large amount of data generated is not readily split into disjoint subsets for storage on a distributed system.

Thus, a technical problem exists in developing an information management system for storing large volumes of data with full redundancy on a series of distributed databases. The technical problem must provide a method of allowing the data to be queried, printed, and archived to long term storage means.

SUMMARY OF THE INVENTION

The present invention is directed to providing a fully redundant distributed database management application. The system of the present invention provides a plurality of database servers for storing portions of the data in separate distributed databases. A central control and configuration facility, itself redundantly implemented, maintains information on the number and configuration of database servers, and on the status of distributed data logging to each of those servers. A request to log data made by a requestor workstation is answered by the central configurator with the identification and access information to a primary and, optionally, a mirrored backup (secondary) database server for the data. The database servers each inform the central configurator of data logging status so that queries for particular data can be directed to the particular server holding that data. As processing loads or storage space dictate, the central configurator will shift data logging to different primary and secondary database servers. Communications over the network is accomplished using a standard communications protocol so that heterogeneous database servers may be implemented.

It is thus an object of the present invention to provide a distributed database system with centralized configuration control.

It is yet another object of the invention to provide a fully redundant database logging system with load balancing function.

Finally, it is an object of the present invention to provide a distributed database management system which allows for quelling, printing, and archiving logged data.

These and other objects of the invention will be made more clear through a discussion of the preferred embodiment with reference to the appended drawings.

DETAILED DESCRIPTION OF THE PREFERRED EMBODIMENT

The preferred embodiment of the present invention has been implemented to provide database collection or logging of computer system operations data at a network workstation. It will be appreciated that the types of data management and logging discussed in the present invention may arise in other processing environments such as factory process control and building management. The present invention is not limited to logging a particular kind of information.

Figure 1:
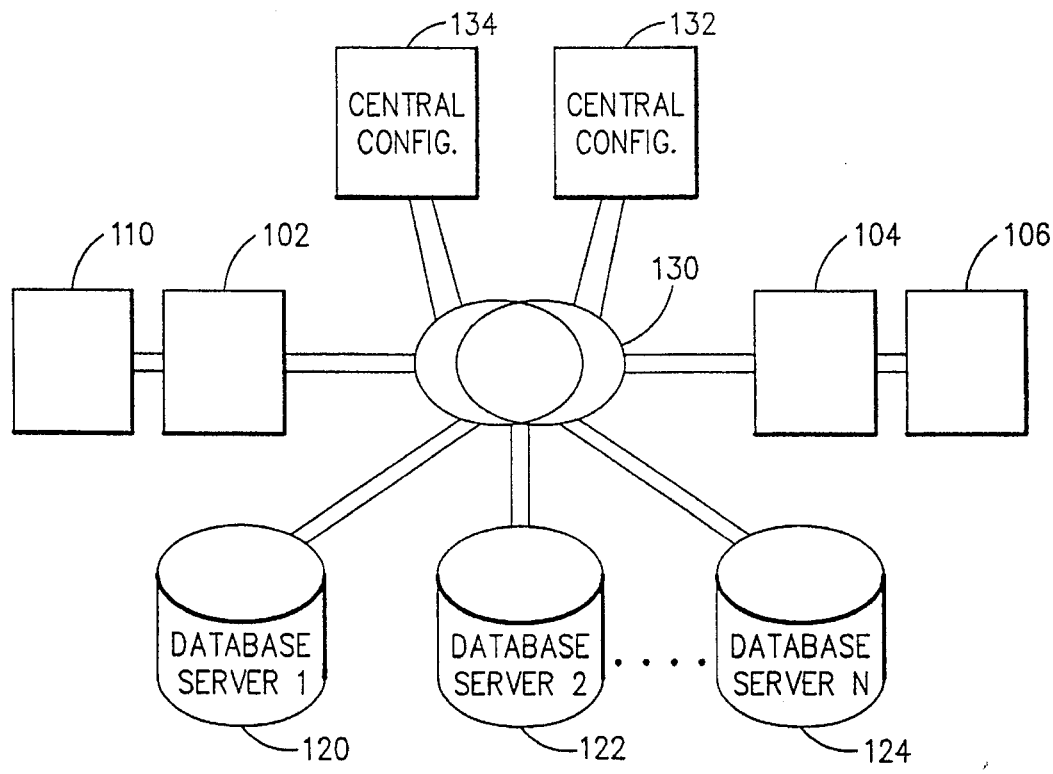
FIG. 1 is a network diagram showing the components of a system according to the present invention.

The present invention is implemented in a network system shown generally in FIG. 1. Workstations 102 and 104 are provided to manage certain processing functions in the network. For example, workstation 104 may be connected as a process controller to physical process 106. Workstation 104 may be serving in the preferred embodiment as a remote console controlling a mainframe computer 106. Workstation 102 on the other hand could be connected as a process controller for a factory automation process 110. In performing process control and management functions, workstations 102 and 104 collect and process, large amounts of data. For historical analysis and troubleshooting purposes, this data frequently needs to be collected or logged to an historical data store. In the preferred embodiment of the present invention, the data generated may consist of several hundred megabytes of data daily. Storage of this volume of data is infeasible on random access units typically found in workstations.

The present invention addresses the large data storage problems by implementing database servers such as those shown at 120, 122, and, 124. These are attached to workstation 102 and 104 by a redundant network 130. Workstations 102 and 104 and database servers 120, 122 and 124 and central configuration controllers 132 and 134 comprise IBM PS/2 computers in the preferred embodiment (PS/2 and IBM are registered trademarks of the IBM Corporation). The network of the preferred embodiment is a dual IBM Token Ring LAN, though other networks such as Ethernet could be used. In addition, central configuration controllers are provided as shown at 132 and 134. The configuration controllers 132, 134 provide a redundant control system for the network. One controller, e.g. 132, serves as the primary controller while the other, e.g. 134, is a redundant alternate controller. Each controller maintains current copies of global configuration information and either can become the primary controller upon failure of the other controller. These control functions are implemented as described in the co-pending application Ser. No. 07/771,063 filed concurrently herewith, identified by attorney Docket No. KI9-91-054, which is commonly assigned. The specification of that case is hereby incorporated by reference.

Figure 2:
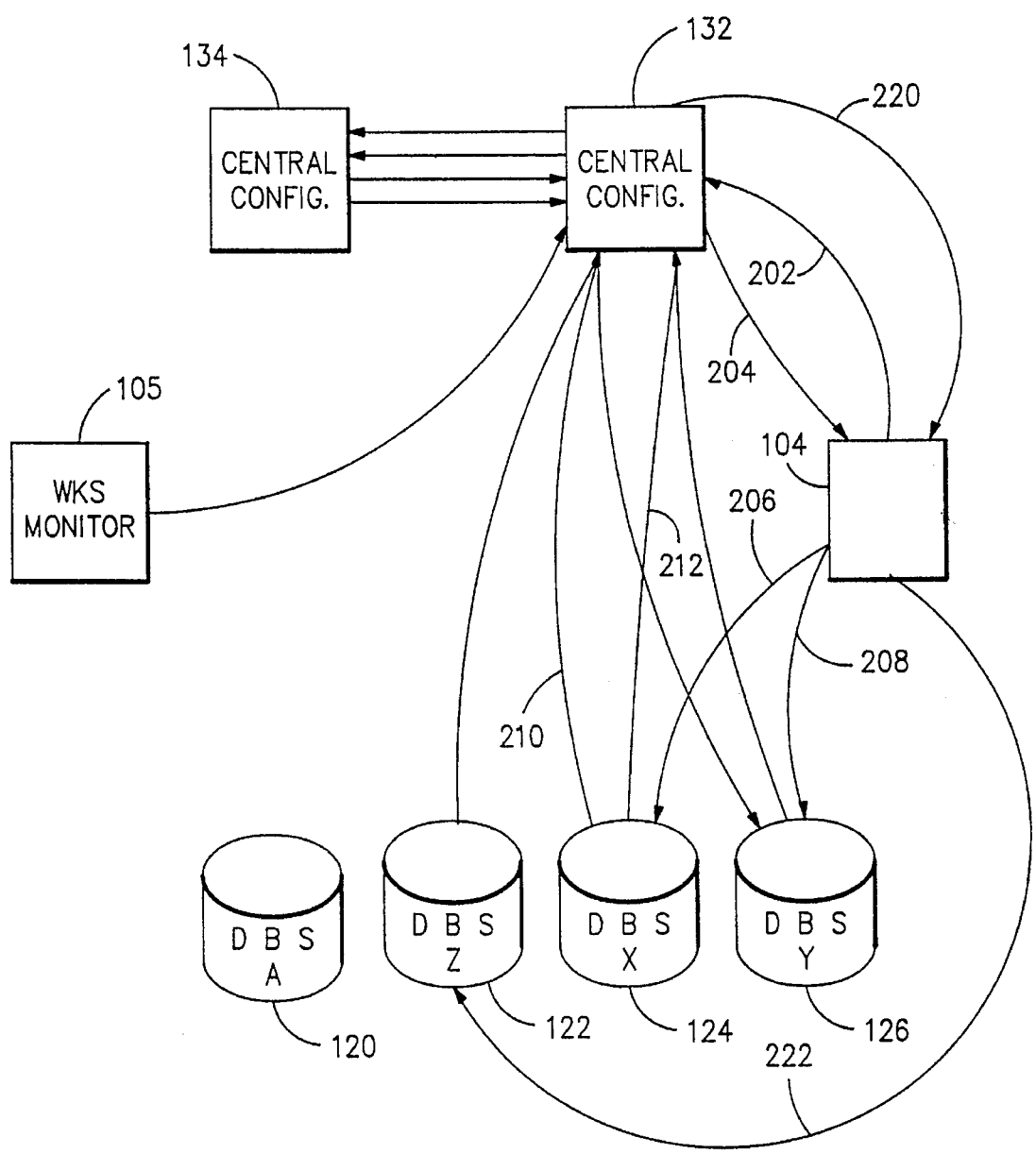
FIG. 2 is a network diagram showing the process message interactions needed to establish and monitor data logging in the system according to the present invention.

The configuration controller manages the process through which data is logged from a workstation 104 to database servers 120–124. The flow of messages required to begin data logging is shown in FIG. 2. As noted above, the configuration controller 132 and the network are each duplicated to provide redundancy for fault tolerant operation.

The central configuration controller 132, 134 contains configuration data showing how many database servers are available and how they are to be accessed. (For simplicity, all further references to the redundant controller will be to the assumed primary controller 132. If controller 132 fails, controller 134 would perform the indicated functions). The requestor workstation 104 generates a request 202 to begin logging data. Controller 132 evaluates the request and responds 204 with the identification and access information for a primary database. 124 (DBSX) and a mirrored redundant database 126 (DBSY) to the workstation 104. The controller assigns database servers based on the type of request, the load on each of the servers, and priority information. The controller 132 also maintains a record of information about the type of request, and the start and end times for that logging request.

The data logging workstation 104 next begins logging to the databases, primary 124 and mirrored 126, over paths 206 and 208. As logging proceeds in the database servers, status messages 210 are transmitted over the network 130 from each server to the central configurator 132. An end of data logging message 212 is also transmitted to the controller 132. As discussed above, central configuration information is replicated to controller 134 to allow fault recovery.

The operator of the network may change the preferred assignment of the database servers for logging purposes. Using a monitor workstation 105, connected to the dual network 130, the operator can change the database priority assignments within the controller 132. Once these changes have been made, the configurator notifies the currently executing logging processes (such as workstation 104) via message 220. Upon receipt of the message 220, workstation 104 changes the destination database servers to which data is being logged. In the example, the change in process stops logging to DBSX 124 via path 206 and substitutes logging to database server Z 122 via path 222.

As can be appreciated, when the volume of data in a particular configuration is expected to increased additional database servers can be installed on the network. The use of a central configuration controller 132 provides flexibility to the network manager to readily add or delete database servers as demanded by the database logging application.

Figure 3:
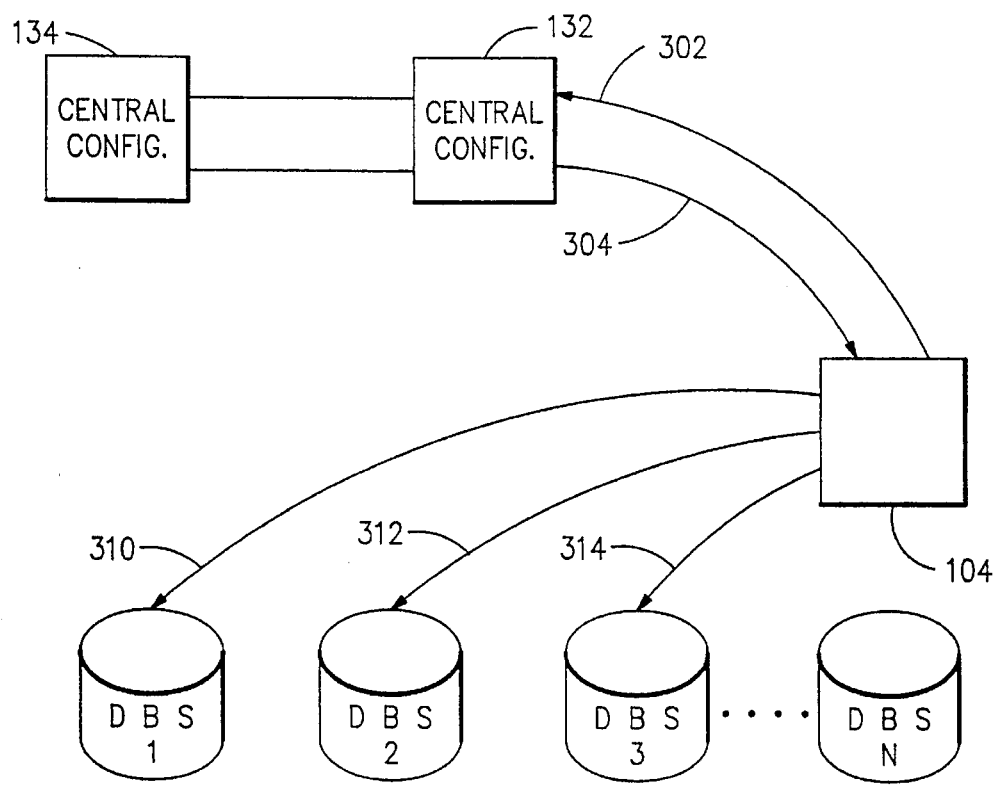
FIG. 3 is a portion of the network diagram illustrating the use of the present invention for data query, printing, and archiving.

The data collected in the databases must be accessible to query, print, and archive. The data may be queried to extract information about historical operations of the system or for similar purposes. The data can be printed or archived to a permanent medium such as tape once its use has been completed. The ability to query the database is, by its nature, limited to that data that has not been archived to long-term storage. A data query using the preferred embodiment of the present invention is formulated using workstation 104 which transmits the request for information to controller 132 (message 302 in FIG. 3). The controller examines its data logging records to determine the database server location or location of the requested data. The server locations for the requested data are transmitted back to workstation 104 (message 304) that then issues queries 310, 312, and 314, (i.e. to each of the relevant databases), to extract the required information. The extracted information is merged and displayed or printed at workstation 104.

The network of the present invention is established to operate using industry standard configuration protocols. The preferred embodiment implements an SAA LU 6.2 protocol for peer-to-peer data exchange. The use of standard industry protocols has the advantage that heterogeneous database servers may be employed as long as they are each responsive to the selected communications protocol.

It will be understood from the foregoing description that various modifications and changes may be made in the preferred embodiment of the present invention without departing from its true spirit. It is intended that this description is for the purposes of illustration only and should not be construed in a limiting sense. The scope of this invention should be limited only by the language of the following claims.

I claim:

1. A computer implemented method for handling a request for the retrieval of specified data in a distributed database environment having a plurality of data requestors and a plurality of database servers, each of said database servers having data storage associated therewith, said request originating from one of said requestors, said data requestors and said database servers being located at respective nodes of a communications network, said method comprising the steps of:

maintaining configuration information regarding said database servers in a plurality of configuration controllers connected to said data requestors and to said database servers via said network, said controllers providing a redundant control system for said network, said configuration information identifying a particular subset of said plurality of database servers storing specified data;

transmitting said request for the retrieval of specified data from the originating data requestor via said network to one of said configuration controllers;

determining the particular subset of said plurality of database servers storing said specified data using said configuration information;

transmitting database server access information identifying said particular subset of said plurality of database servers from said configuration controller via said network to said originating data requestor; and accessing from said originating data requestor the data storage of the subset of said plurality of database servers identified by said access information to retrieve said data.

2. The method of claim 1, further comprising the step of:

merging the data retrieved from said subset of said plurality of database servers.

3. The method of claim 2, including the further step of:

printing the merged data retrieved from said database servers.

4. The method of claim 2 in which said subset comprises a plurality of database servers, said method including the further step of:

displaying the merged data retrieved from said database servers.

* * * * *

UNITED STATES PATENT AND TRADEMARK OFFICE
CERTIFICATE OF CORRECTION

PATENT NO. : 5,606,693

DATED : February 25, 1997

INVENTOR(S) : Nilsen et al.

It is certified that error appears in the above-identified patent and that said Letters Patent is hereby corrected as shown below: On title page, item [54] and col. 1, lines 1-2
Title: "DISTRIBUTED DATABASE MANAGEMENT OVER A NETWORK" should be --METHOD AND APPARATUS FOR HANDLING DATA STORAGE REQUESTS IN A DISTRIBUTED DATABASE ENVIRONMENT--.

Signed and Sealed this

Eighteenth Day of April, 2000

Attest:

Q. TODD DICKINSON

*Attesting Officer*　　　　　　　*Director of Patents and Trademarks*